(12) United States Patent
Ye et al.

(10) Patent No.: US 12,248,231 B2
(45) Date of Patent: Mar. 11, 2025

(54) CAMERA SYSTEM AND CONNECTING BRACKET THEREOF

(71) Applicant: ZHEJIANG DAHUA TECHNOLOGY CO., LTD., Zhejiang (CN)

(72) Inventors: Dong Ye, Hangzhou (CN); Hui Zhan, Hangzhou (CN); Xiyang Wei, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 258 days.

(21) Appl. No.: 17/815,561

(22) Filed: Jul. 27, 2022

(65) Prior Publication Data
US 2022/0365406 A1    Nov. 17, 2022

Related U.S. Application Data

(63) Continuation of application No. PCT/CN2021/076586, filed on Feb. 10, 2021.

(30) Foreign Application Priority Data

Feb. 19, 2020  (CN) .......................... 202020183540.9

(51) Int. Cl.
H04N 5/335   (2011.01)
F16M 13/02   (2006.01)
(Continued)

(52) U.S. Cl.
CPC .......... *G03B 17/561* (2013.01); *F16M 13/02* (2013.01); *H04N 23/45* (2023.01); *H04N 23/54* (2023.01);
(Continued)

(58) Field of Classification Search
CPC ................................................ H04N 2213/001
See application file for complete search history.

(56) References Cited

U.S. PATENT DOCUMENTS

2005/0212947 A1* 9/2005 Sato .................. H01L 27/14618
348/340
2010/0166410 A1* 7/2010 Chang .................... G03B 35/00
396/326
(Continued)

FOREIGN PATENT DOCUMENTS

| CN | 204350121 U | 5/2015 |
| CN | 206301135 U | 7/2017 |

(Continued)

OTHER PUBLICATIONS

International Search Report in PCT/CN2021/076586 mailed on Apr. 28, 2021, 4 pages.
(Continued)

*Primary Examiner* — Gary C Vieaux
(74) *Attorney, Agent, or Firm* — METIS IP LLC

(57) ABSTRACT

The present disclosure provides a connecting bracket and a camera system. The camera system may include a first lens unit, a second lens unit, a first image sensor unit corresponding to the first lens unit, a second image sensor unit corresponding to the second lens unit, and a connecting bracket configured to connect the first lens unit and the first image sensor unit to form a first camera component, and connect the second lens unit and the second image sensor unit to form a second camera component. A predetermined angle may be formed between a first optical axis of the first camera component and a second optical axis of the second camera component.

18 Claims, 8 Drawing Sheets

(51) Int. Cl.
  *G03B 17/56* (2021.01)
  *H04N 23/45* (2023.01)
  *H04N 23/54* (2023.01)
  *H04N 23/55* (2023.01)
  *H04N 7/18* (2006.01)
  *H04N 13/239* (2018.01)

(52) U.S. Cl.
  CPC ............. *H04N 23/55* (2023.01); *H04N 7/181* (2013.01); *H04N 13/239* (2018.05); *H04N 2213/001* (2013.01)

(56) References Cited

U.S. PATENT DOCUMENTS

| | | | | |
|---|---|---|---|---|
| 2016/0173757 A1* | 6/2016 | Choi | .................... | H04N 23/611 348/262 |
| 2016/0241841 A1* | 8/2016 | Dorot | ................. | H04N 13/239 |
| 2017/0064172 A1* | 3/2017 | Vittu | .................... | H04N 23/54 |
| 2017/0150061 A1* | 5/2017 | Shabtay | ................. | H04N 23/67 |
| 2018/0024419 A1 | 1/2018 | Sheridan | | |
| 2018/0027185 A1 | 1/2018 | Miller et al. | | |
| 2019/0369678 A1* | 12/2019 | Park | .................... | H04M 1/0264 |
| 2021/0329149 A1* | 10/2021 | Zhang | .................... | G03B 17/12 |

FOREIGN PATENT DOCUMENTS

| | | |
|---|---|---|
| CN | 208094668 U | 11/2018 |
| CN | 109040568 A | 12/2018 |
| CN | 109579783 A | 4/2019 |
| CN | 209390111 U | 9/2019 |
| CN | 110392190 A | 10/2019 |
| CN | 209748723 U | 12/2019 |
| WO | 2021088821 A1 | 5/2021 |
| WO | 2021164690 A1 | 8/2021 |

OTHER PUBLICATIONS

Written Opinion in PCT/CN2021/076586 mailed on Apr. 28, 2021, 6 pages.
The Extended European Search Report in European Application No. 21757429.2 mailed on May 19, 2023, 9 pages.

\* cited by examiner

CAMERA SYSTEM AND CONNECTING BRACKET THEREOF

CROSS-REFERENCE TO RELATED APPLICATIONS

This application is a continuation of International Application No. PCT/CN2021/076586, filed on Feb. 10, 2021, which claims priority of Chinese Patent Application No. 202020183540.9, filed on Feb. 19, 2020, the contents of each of which are hereby incorporated by reference.

TECHNICAL FIELD

The present disclosure generally relates to a camera system, and more particularly, relates to a connecting bracket of a binocular camera system.

BACKGROUND

With the development of video surveillance, binocular cameras have become more and more popular due to their advantages of wide measurement range, quick scene switching, stereo imaging, etc. Images or videos captured by a binocular camera system having two cameras (e.g. a left camera and a right camera) can be fused to meet various needs, such as traffic monitoring. Generally, a binocular camera system includes two cameras separately installed at different positions of a shield. The installation accuracy of the two cameras can greatly affect the quality of the fused image or video. Therefore, it is desirable to provide connecting brackets to improve installation accuracy of binocular cameras.

SUMMARY

According to an aspect of the present disclosure, a camera system is provided. The camera system may include a first lens unit, a second lens unit, a first image sensor unit corresponding to the first lens unit, a second image sensor unit corresponding to the second lens unit, and a connecting bracket. The connecting bracket may be configured to connect the first lens unit and the first image sensor unit to form a first camera component, and connect the second lens unit and the second image sensor unit to form a second camera component. A predetermined angle may be formed between a first optical axis of the first camera component and a second optical axis of the second camera component.

In some embodiments, the first lens unit and the second lens unit may be disposed on a first side of the connecting bracket. The first image sensor unit and the second image sensor unit may be disposed on a second side of the connecting bracket.

In some embodiments, the connecting bracket may include a bracket body configured to support the first camera component and the second camera component, a first mounting surface for connecting the first lens unit, a second mounting surface corresponding to the first mounting surface for connecting the first image sensor unit, a third mounting surface for connecting the second lens unit, and a fourth mounting surface corresponding to the third mounting surface for connecting the second image sensor unit. The first mounting surface may be parallel to the second mounting surface. The third mounting surface may be parallel to the fourth mounting surface. An angle between the first mounting surface and the third mounting surface may be equal to the predetermined angle.

In some embodiments, the first mounting surface or the third mounting surface may be parallel to the bracket body of the connecting bracket.

In some embodiments, the first lens unit may include a first connecting part. The second lens unit may include a second connecting part. The connecting bracket may further include a first mounting part on the first mounting surface configured to cooperate with the first connecting part to mount the first lens unit on the connecting bracket, and a second mounting part on the third mounting surface configured to cooperate with the second connecting part to mount the second lens unit on the connecting bracket.

In some embodiments, the first connecting part may include a first threaded joint. The first mounting part may include a first threaded connector corresponding to the first threaded joint. In some embodiments, the second connecting part may include a second threaded joint. The second mounting part may include a second threaded connector corresponding to the second threaded joint.

In some embodiments, the first connecting part may include a first fixing plate and the first mounting part may include a first fixing seat corresponding to the first fixing plate. The first fixing plate may be connected to the first fixing seat by one or more screws. In some embodiments, the second connecting part may include a second fixing plate and the second mounting part may include a second fixing seat corresponding to the second fixing plate. The second fixing plate may be connected to the second fixing seat by one or more screws.

In some embodiments, at least one image sensor unit of the first image sensor unit or the second image sensor unit may include a third fixing plate. The at least one image sensor unit may be connected to the connecting bracket by one or more screws through the third fixing plate.

In some embodiments, the predetermined angle may be within an angle range from 0° to 15°.

In some embodiments, the connecting bracket may further include a first aperture configured to transmit one or more optical signals from the first lens unit to the first image sensor unit, and a second aperture configured to transmit one or more optical signals from the second lens unit to the second image sensor unit.

In some embodiments, the connecting bracket may further include a first protruding part disposed around the first aperture. The first protruding part may be configured to limit a position of the first lens unit, provide a dust-proof function, or block an interference light. In some embodiments, the connecting bracket may further include a second protruding part disposed around the second aperture. The second protruding part may be configured to limit a position of the second lens unit, provide a dust-proof function, or block an interference light.

In some embodiments, the connecting bracket may further include one or more springs configured to adjust at least one of the second mounting surface, or the fourth mounting surface.

In some embodiments, the connecting bracket may further include a reinforced structure configured to strengthen the connecting bracket.

In some embodiments, the first lens unit may include a telephoto lens unit, and the second lens unit may include a wide-angle lens unit.

According to another aspect of the present disclosure, a connecting bracket is provided. The connecting bracket may include a bracket body configured to support a first camera component and a second camera component. The bracket body may include a first connecting portion configured to support the first camera component, and a second connecting portion configured to support the second camera component. A predetermined angle may be formed between the first connecting portion and the second connecting portion such that when the first camera component is mounted on the first connecting portion and the second camera component is mounted on the second connecting portion. An angle between a first optical axis of the first camera component and a second optical axis of the second camera component may be equal to the predetermined angle.

In some embodiments, the first connecting portion may include a first mounting surface and a second mounting surface corresponding to the first mounting surface. The first mounting surface may be configured to connect a first lens unit of the first camera component. The second mounting surface may be configured to connect a first image sensor unit of the first camera component. The first mounting surface and the second mounting surface may be disposed on opposite sides of the bracket body.

In some embodiments, the second connecting portion may include a third mounting surface and a fourth mounting surface corresponding to the third mounting surface. The third mounting surface may be configured to connect a second lens unit of the second camera component. The fourth mounting surface may be configured to connect a second image sensor unit of the second camera component. The third mounting surface and the fourth mounting surface may be disposed on opposite sides of the bracket body.

In some embodiments, the first mounting surface and the third mounting surface may be disposed on a same side of the bracket body. The second mounting surface and the fourth mounting surface may be disposed on a same side of the bracket body.

In some embodiments, an angle between the first mounting surface and the third mounting surface may be equal to the predetermined angle. In some embodiments, an angle between the second mounting surface and the fourth mounting surface may be equal to the predetermined angle.

According to another aspect of the present disclosure, a connecting bracket is provided. The connecting bracket may include a bracket body configured to support a first camera component and a second camera component. The bracket body may include a first mounting surface configured to connect a first lens unit of the first camera component, a second mounting surface configured to connect a first image sensor unit of the first camera component, a third mounting surface configured to connect a second lens unit of the second camera component, and a fourth mounting surface configured to connect a second image sensor unit of the second camera component. The first mounting surface may be parallel to the second mounting surface. The third mounting surface may be parallel to the fourth mounting surface. A predetermined angle may be formed between the first mounting surface and the third mounting surface.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
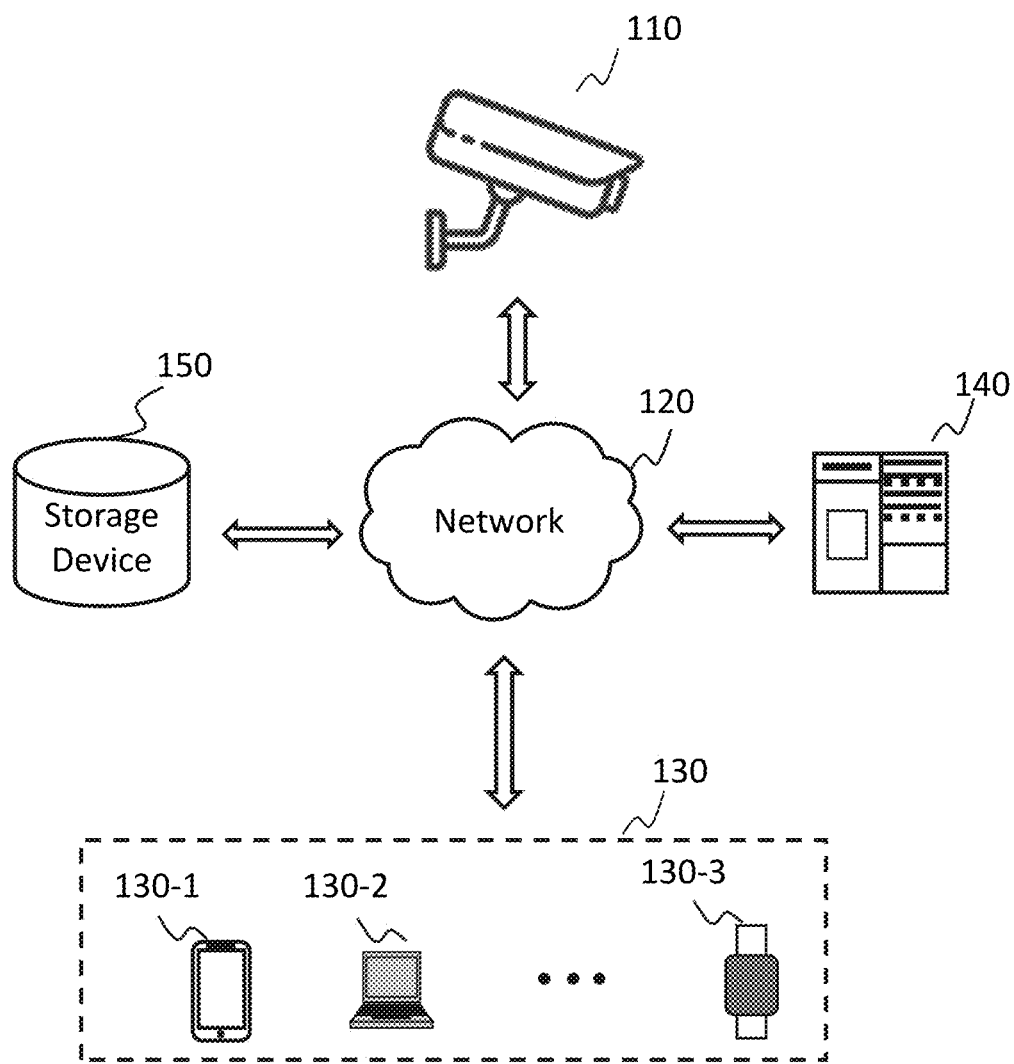
FIG. 1 is a schematic diagram illustrating an exemplary monitoring system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It should also be understood that terms such as "top," "bottom," "upper," "lower," "vertical," "lateral," "above," "below," "upward(s)," "downward(s)," "left-hand side,"

"right-hand side," "horizontal," and other such spatial reference terms are used in a relative sense to describe the positions or orientations of certain surfaces/parts/components of a vehicle with respect to other such features of the vehicle when the vehicle is in a normal operating position and may change if the position or orientation of the vehicle changes.

It will be understood that, although the terms "first," "second," "third," "fourth," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In order to make the purpose, technical solution, and advantages of the present disclosure clearer, the present disclosure will be further described in detail below with reference to the accompanying drawings and embodiments. It should be understood that the specific embodiments described herein are merely illustrative of the present disclosure and are not intended to limit the present disclosure.

The present disclosure relates to a connecting bracket and a camera system. The camera system may include a first lens unit, a second lens unit, a first image sensor unit corresponding to the first lens unit, a second image sensor unit corresponding to the second lens unit, and a connecting bracket. The connecting bracket may be configured to connect the first lens unit and the first image sensor unit to form a first camera component, and connect the second lens unit and the second image sensor unit to form a second camera component. A predetermined angle may be formed between a first optical axis of the first camera component and a second optical axis of the second camera component.

Accordingly, the predetermined angle between the first optical axis of the first camera component and the second optical axis of the second camera component may be achieved by a proper design of the structure of the connecting bracket. Besides, two camera components of the camera system may be integrated into one component using the connecting bracket, thereby improving the installation accuracy of the two camera components.

FIG. 1 is a schematic diagram illustrating an exemplary monitoring system according to some embodiments of the present disclosure. As illustrated in FIG. 1, a monitoring system 100 may include one or more cameras 110, a network 120, a terminal device 130, a processing device 140, and a storage device 150.

The camera(s) 110 may be configured to capture one or more images or videos. In some embodiments, the camera(s) 110 may include a binocular camera having two camera components. As used herein, a camera component may be a single camera including a lens unit, an image sensor unit, and/or one or more other units (e.g., a processor, a controller, etc.). In some embodiments, the two camera components may capture images or videos simultaneously or not. For example, one of the two camera components can be turned on while the other one can be turned off or on standby. In some embodiments, the two camera components may include the same or different cameras to adapt to different needs. For example, the two camera components may be implemented in the same configuration and may be used cooperatively to achieve a relatively wide capturing range. As another example, one camera component may include a telephoto camera, and the other one may include a wide-angle camera. A capturing range of the telephoto camera may be within a capturing range of the wide-angle camera. The wide-angle camera may have a relatively wide capturing range and provide coarse information of a relatively large area. The telephoto camera may have a relatively narrow capturing range and provide detailed information of a relatively small area (e.g., an area of interest within the relatively large area). In such cases, a fused image or video may be generated by fusing the images or videos captured by the two camera components. The fused image or video may include both coarse information of a relatively large area and detailed information of an area of interest within the relatively large area. In some embodiments, the camera 110 may transmit the captured images or videos to one or more components (e.g., the processing device 140, the terminal device 130, and/or the storage device 150) of the monitoring system 100 via the network 120.

The network 120 may facilitate the exchange of information and/or data for the monitoring system 100. In some embodiments, one or more components (e.g., the processing device 140, the camera 110, the terminal device 130, or the storage device 150) of the monitoring system 100 may communicate information and/or data with one or more other components of the monitoring system 100 via the network 120. For example, the processing device 140 may acquire images from the camera 110 via the network 120. As another example, the camera 110 may transmit images to the storage device 150 for storage via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the monitoring system 100 may be connected to the network 120 to exchange data and/or information.

The terminal device 130 may be configured to receive information and/or data from the processing device 140, the camera 110, and/or the storage device 150 via the network 120. For example, the terminal device 130 may receive images and/or videos from the camera 110. As another example, the terminal device 130 may transmit instructions to the camera 110 and/or the processing device 140. In some embodiments, the terminal device 130 may provide a user interface via which a user may view information and/or input data and/or instructions to the monitoring system 100. For example, the user may view, via the user interface, image information associated with a traffic violation behavior of a vehicle acquired from the processing device 140. As another example, the user may input, via the user interface, an instruction to set a traffic monitoring parameter (e.g., a monitoring range) of the camera 110. In some embodiments, the terminal device 130 may include a mobile device 130-1, a computer 130-2, a wearable device 130-3, or the like, or any combination thereof. In some embodiments, the terminal device 130 may include a display that can display information in a human-readable form, such as text, image, audio, video, graph, animation, or the like, or any combination thereof. The display of the terminal device 130 may include a cathode ray tube (CRT) display, a liquid crystal display (LCD), a light-emitting diode (LED) display, a plasma display panel (PDP), a three dimensional (3D) display, or the like, or a combination thereof. In some embodiments, the terminal device 130 may be connected to one or more components (e.g., the processing device 140, the camera 110, and/or the storage device 150) of the monitoring system 100 via the network 120.

The processing device 140 may process data and/or information acquired from the camera 110, the terminal device 130, and the storage device 150. For example, the processing device 140 may fuse images or videos captured by the camera 110 (e.g., one or more cameras mounted near a crosswalk). The processing device 140 may determine whether a traffic violation behavior occurs at the crosswalk based on the fused images or videos. In some embodiments, the processing device 140 may be a single server or a server group. The server group may be centralized or distributed (e.g., the processing device 140 may be a distributed system). In some embodiments, the processing device 140 may be local or remote. For example, the processing device 140 may access information and/or data stored in or captured by the camera 110, the terminal device 130, and/or the storage device 150 via the network 120. As another example, the processing device 140 may be directly connected to the camera 110, the terminal device 130, and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processing device 140 may include one or more processing engines (e.g., single-core processing engine(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 140 may be implemented by a computing device (e.g., a computing device including a processor, a storage, an input/output (I/O), and a communication port) or a mobile device (e.g., a mobile device including a communication platform, a display, a graphic processing unit (GPU), a central processing unit (CPU), an I/O, a memory, and a storage.

The storage device 150 may be configured to store data and/or instructions. The data and/or instructions may be acquired from, for example, the processing device 140, the camera 110, and/or any other component of the monitoring system 100. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components (e.g., the processing device 140, the camera 110, or the terminal device 130) of the monitoring system 100. One or more components in the monitoring system 100 may access the data or instructions stored in the storage device 150 via the network 120. In some embodiments, the storage device 150 may be directly connected to or communicate with one or more components (e.g., the processing device 140, the camera 110, or the terminal device 130) of the monitoring system 100. In some embodiments, the storage device 150 may be part of another component of the monitoring system 100, such as the processing device 140, the camera 110, or the terminal device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the monitoring system 100 may include one or more additional components and/or one or more components of the monitoring system 100 described above may be omitted. Additionally or alternatively, two or more components of the monitoring system 100 may be integrated into a single component. A component of the monitoring system 100 may be implemented on two or more sub-components.

Figure 2A:
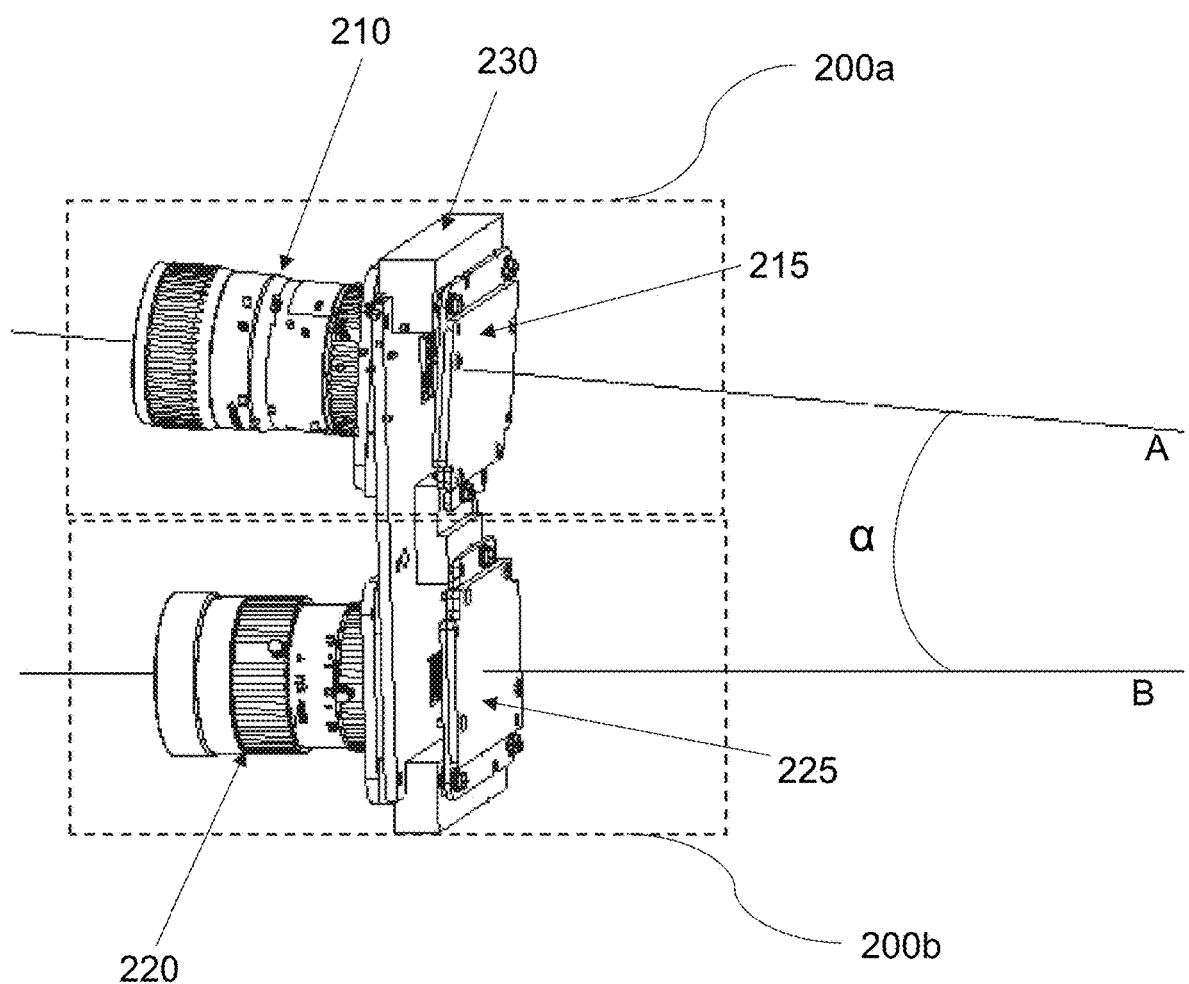
FIG. 2A is a schematic diagram illustrating an exemplary binocular camera 200 according to some embodiments of the present disclosure.
Figure 2B:
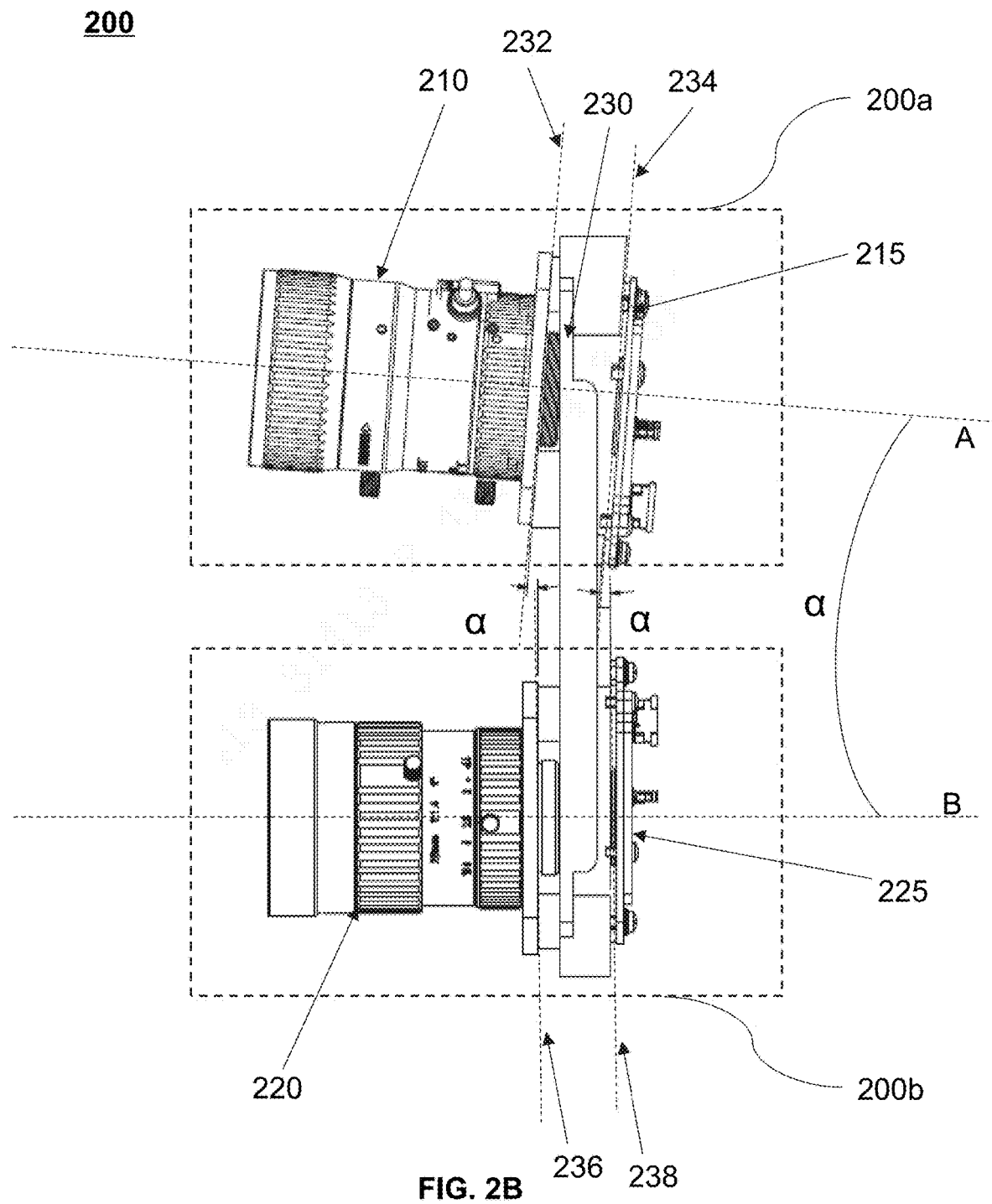
FIG. 2B illustrates a side view of the binocular camera 200 shown in FIG. 2A according to some embodiments of the present disclosure.

FIG. 2A is a schematic diagram illustrating an exemplary binocular camera 200 according to some embodiments of the present disclosure. FIG. 2B illustrates a side view of the binocular camera 200 shown in FIG. 2A according to some embodiments of the present disclosure. As shown in FIGS. 2A and 2B, the binocular camera 200 may include a first lens unit 210, a second lens unit 220, a first image sensor unit 215 corresponding to the first lens unit 210, a second image sensor unit 225 corresponding to the second lens unit 220, and a connecting bracket 230. In some embodiments, the binocular camera 200 may include two camera components (e.g., a first camera component 200a and a second camera component 200b).

In some embodiments, the first camera component 200a may be formed by the first lens unit 210, a first part (e.g., an upper part illustrated in FIG. 2A) of the connecting bracket 230, and/or the first image sensor unit 215. In such cases, a light passing through the first lens unit 210 may be transmitted to the first image sensor unit 215 through a first aperture (not shown) on the first part of the connecting bracket 230. The first image sensor unit 215 may convert the light transmitted through the first lens unit 210 into one or more first electrical signals. Similarly, the second camera component 200b may be formed by the second lens unit 220, a second part (e.g., a lower part illustrated in FIG. 2A) of the connecting bracket 230, and/or the second image sensor unit 225. A light passing through the second lens unit 220 may be transmitted to the second image sensor unit 225 through a second aperture (not shown) on the lower part of the connecting bracket 230. The second image sensor unit 225 may convert the light transmitted through the second lens unit 220 into one or more second electrical signals.

In some embodiments, the first camera component 200a may include a telephoto camera, a wide-angle camera, an infrared camera, a visible light camera, a thermal imaging camera, or the like, or any combination thereof. The configuration of the second camera component 200b may be the same as or different from the configuration of the first camera component 200a. In other words, the first lens unit 210 may be the same as or different from the second lens unit 220, and the first image sensor unit 215 may be the same as or different from the second image sensor unit 225. For example, the first camera component 200a may include a wide-angle camera, while the second camera component 200b may include a telephoto camera. A relatively narrow capturing range of the telephoto camera may be within a relatively wide capturing range of the wide-angle camera. In such cases, fused image(s) or video(s) may be generated by fusing images or videos captured by the first camera component 200a and the second camera component 200b. Therefore, the fused image(s) or video(s) may include both coarse information of an area corresponding to the relatively wide capturing range of the wide-angle camera and detailed information of an area corresponding to the relatively narrow capturing range of the telephoto camera. As another example, both the first camera component 200a and the second camera component 200b may be telephoto cameras. In such cases, the first camera component 200a and the second camera component 200b may be cooperated to monitor a capturing range larger than any one of the first camera component 200a and the second camera component 200b.

In some embodiments, the first lens unit 210 and the second lens unit 220 may be disposed on one side of the connecting bracket 230, and the first image sensor unit 215 and the second image sensor unit 225 may be disposed on another side of the connecting bracket 230. That is, the first camera component 200a and the second camera component 200b may face the same side of the connecting bracket 230 (e.g., as shown in FIGS. 2A and 2B). In some embodiments, the first lens unit 210 and the second image sensor unit 225 may be disposed on one side of the connecting bracket 230, and the second lens unit 220 and the first image sensor unit 215 may be disposed on another side of the connecting bracket 230. That is, the first camera component 200a and the second camera component 200b may face different sides of the connecting bracket 230.

In some embodiments, the first camera component 200a may be disposed in a first direction and the second camera component 200b may be disposed in a second direction. As used herein, a direction in which a specific camera component is disposed may refer to a direction of an optical axis of the specific camera component. In some embodiments, the first direction and the second direction may be coplanar. In such cases, the first direction and the second direction may form an angle on the corresponding plane. For example, the first direction and the second direction may be in a same vertical plane, and the angle between the first direction and the second direction may be a as illustrated in FIGS. 2A and 2B. Alternatively, the first direction and the second direction may be in a same horizontal plane. In some embodiments, the first direction and the second direction may be in different planes. In such cases, the first direction and the second direction may form an angle in the horizontal direction and an angle in the vertical direction. As used herein, an angle between two optical axes in the horizontal direction may refer to an angle between the projections of the two optical axes on the horizontal plane. An angle between two optical axes in the vertical direction may refer to an angle between the projections of the two optical axes on the vertical plane. For illustration purposes, the first direction and the second direction being in a same vertical plane may be taken as an example which is not intended to limit the scope of the present disclosure.

In some embodiments, the relative orientation of the first camera component 200a and the second camera component 200b may be characterized by an angle between a first optical axis of the first camera component 200a and a second optical axis of the second camera component 200b. In some embodiments, if the first camera component 200a and the second camera component 200b face the same side of the connecting bracket 230 (e.g., as illustrated in FIG. 2A), and the first optical axis of the first camera component 200a is parallel to the second optical axis of the second camera component 200b, the angle between the first optical axis of the first camera component 200a and the second optical axis of the second camera component 200b may be defined as 0°. If the first camera component 200a and the second camera component 200b face different sides of the connecting bracket 230, and the first optical axis of the first camera component 200a is parallel to the second optical axis of the second camera component 200b, the angle between the first optical axis of the first camera component 200a and the second optical axis of the second camera component 200b may be defined as 180°. Therefore, the angle α between the first optical axis (e.g., as illustrated by line A in FIGS. 2A and 2B) of the first camera component 200a and the second optical axis (e.g., as illustrated by line B in FIGS. 2A and 2B) of the second camera component 200b may be in an angle range from 0° to 180°. In some embodiments, the angle α may be in an angle range from 0° to 90°. In some embodiments, the angle α may be in an angle range from 0° to 60°. In some embodiments, the angle α may be in an angle range from 0° to 30°. In some embodiments, the angle α may be in an angle range from 0° to 20°. In some embodiments, the angle α may be in an angle range from 0° to 15°. In some embodiments, the angle α may be in an angle range from 0° to 10°. In some embodiments, the angle α may be in an angle range from 0° to 5°. In some embodiments, the angle α may be in an angle range from 5° to 15°. In some embodiments, the angle α may be in an angle range from 10° to 15°. For example, the angle α may be 1°, 3°, 5°, 7°, 10°, 15°, 20°, 30°, 45°, 60°, 90°, 150°, or 180°. It should be noted that if the angle α is greater than 90°, it means that the first camera component 200a and the second camera component 200b face different sides of the connecting bracket 230.

In some embodiments, the angle α between the first optical axis and the second optical axis may be determined by a structure of the connecting bracket 230. For example, if the first direction of the first camera component 200a and the second direction of the second camera component 200b is in a same vertical plane, and the first camera component 200a and the second camera component 200b are arranged opposite to each other (as illustrated in FIG. 2B), an angle between a first mounting surface 232 of the connecting bracket 230 for mounting the first lens unit 210 and a third mounting surface 236 of the connecting bracket 230 for mounting the second lens unit 220 may be set as the angle α. Correspondingly, an angle between a second mounting surface 234 of the connecting bracket 230 for mounting the first image sensor unit 215 and a fourth mounting surface 238 of the connecting bracket 230 for mounting the second image sensor unit 225 may be set as the angle α. In some embodiments, the first mounting surface corresponding to the first lens unit 210 may be parallel to the second mounting surface corresponding to the first image sensor unit 215, so that an optical center of the first image sensor unit 215 can be on an optical axis of the first lens unit 210. In some embodiments, the third mounting surface corresponding to the second lens unit 220 may be parallel to the fourth mounting surface corresponding to the second image sensor unit 225, so that an optical center of the second image sensor unit 225 can be on an optical axis of the second lens unit 220. Therefore, after the first lens unit 210, the first image sensor unit 215, the second lens unit 220, and the second image sensor unit 225 are mounted on the connecting bracket 230, the angle between the first optical axis of the camera component 200a and the second optical axis of the camera component 200b may be equal to a. In some embodiments, the angle α may be in a range from 0° to 90° such as 1°, 3°, 5°, 7°, 10°, 15°, etc.

As another example, when the first direction of the first camera component 200a and the second direction of the second camera component 200b is in a same vertical plane, and the first camera component 200a and the second camera component 200b are arranged facing each other, an angle between the first mounting surface 232 and the third mounting surface 236 may also be set as the angle α. Correspondingly, an angle between the second mounting surface 234 and the fourth mounting surface 238 may also be set as the angle α. The first mounting surface 232 corresponding to the first lens unit 210 may be parallel to the second mounting surface corresponding 234 to the first image sensor unit 215, and the third mounting surface 236 corresponding to the second lens unit 220 may be parallel to the fourth mounting surface 238 corresponding to the second image sensor unit 225. Therefore, after the first lens unit 210, the first image sensor unit 215, the second lens unit 220, and the second image sensor unit 225 are mounted on the connecting bracket 230, the angle between the first optical axis of the first camera component 200a and the second optical axis of the camera component 200b may be equal to α. In such cases, the angle α may also be in a range from 0° to 90° such as 1°, 3°, 5°, 7°, 10°, 15°, etc. More descriptions regarding the structure of the connecting bracket 230 may be found elsewhere in the present disclosure (e.g., FIGS. 5A-5B and 6A-6C and the descriptions thereof).

Figure 3:
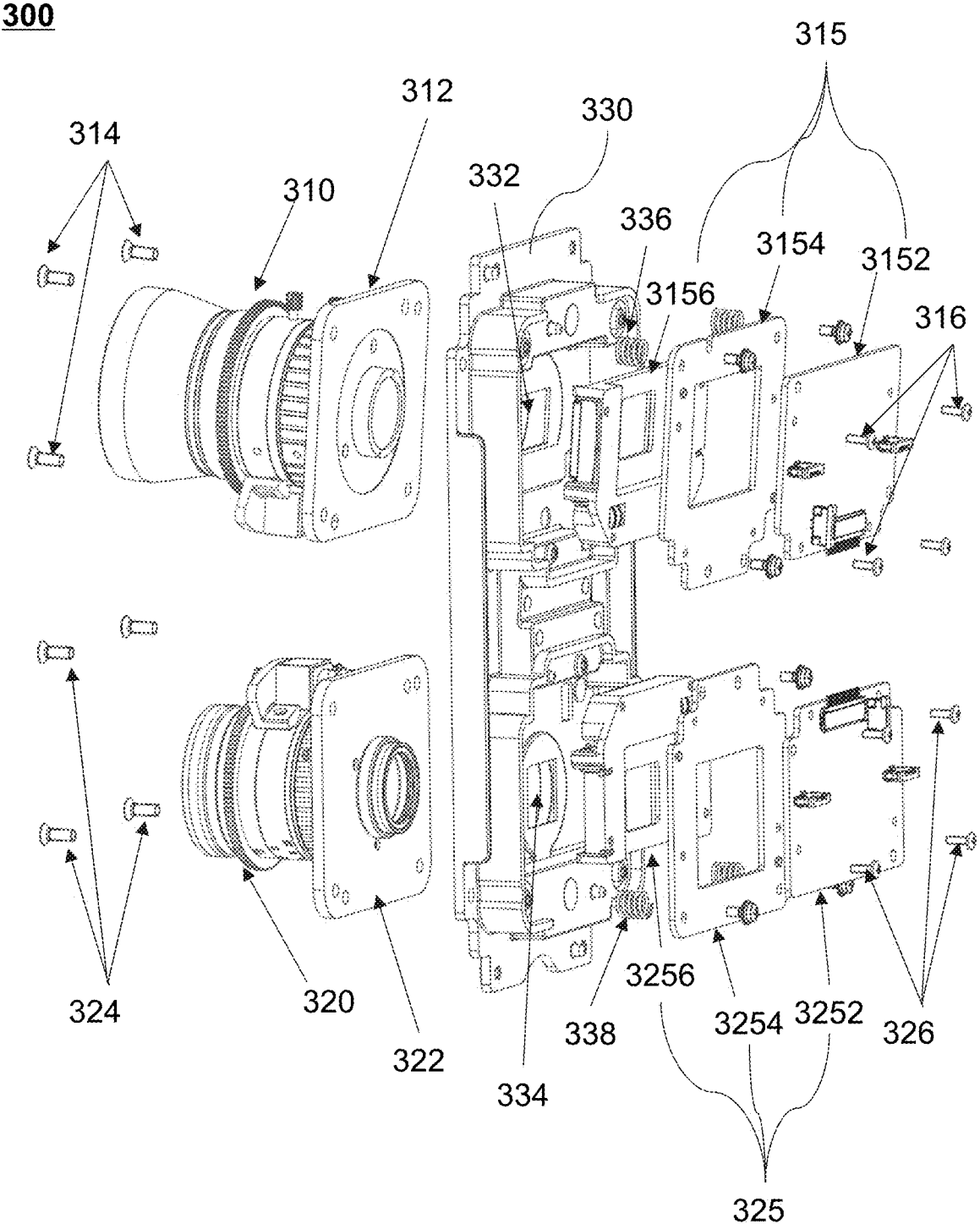
FIG. 3 is an exploded diagram of an exemplary binocular camera according to some embodiments of the present disclosure.
Figure 4:
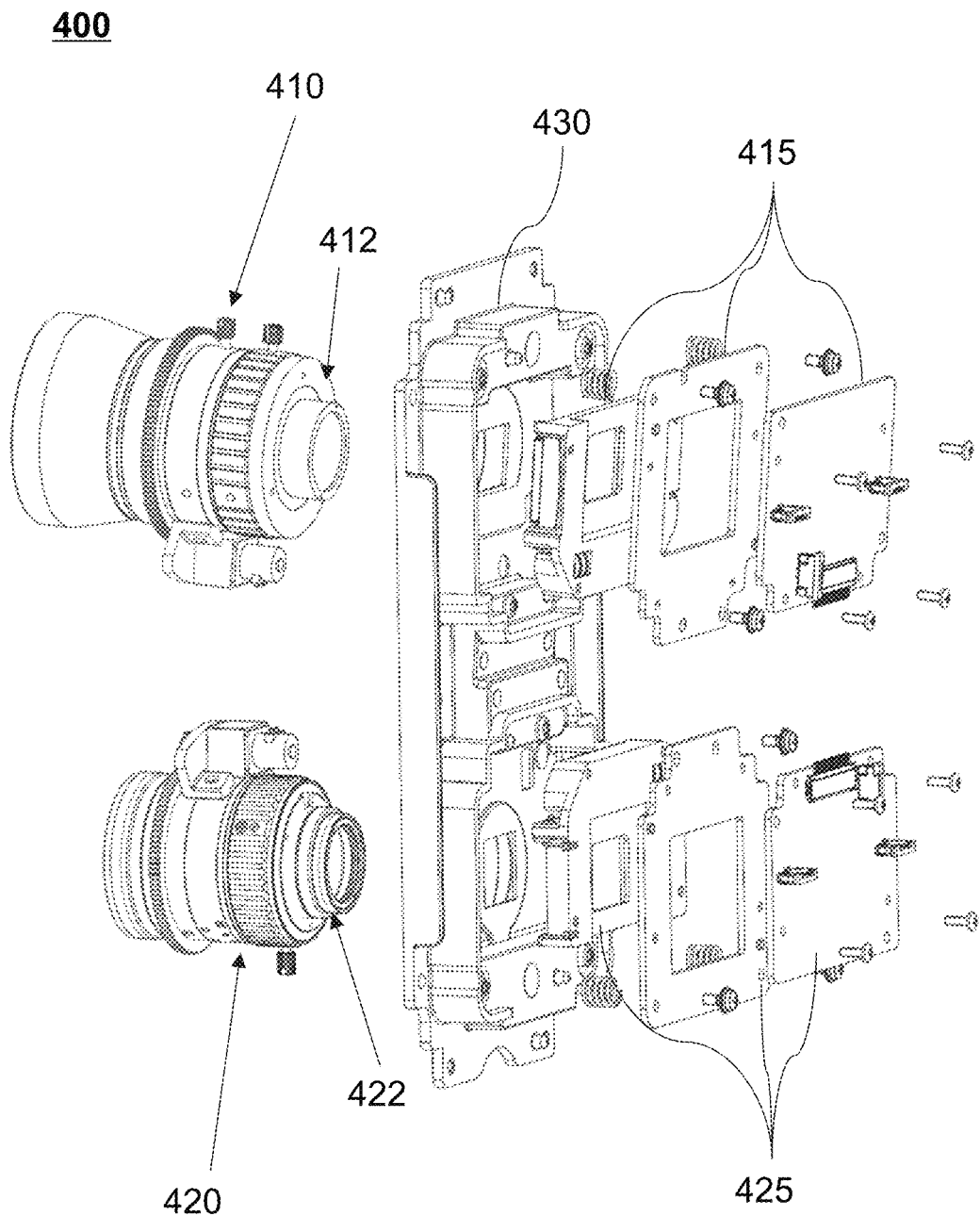
FIG. 4 is an exploded diagram of an exemplary binocular camera according to some embodiments of the present disclosure.

In some embodiments, at least one lens unit of the first lens unit 210 or the second lens unit 220 may be mounted on the connecting bracket 230 through a connecting part of the at least one lens unit and a mounting part on the connecting bracket 230 corresponding to the connecting part. The connecting part may be implemented in a configuration of a threaded joint, a fixing plate, or the like, or a combination thereof. In some embodiments, the connecting part may include a threaded joint (e.g., as shown in FIG. 4), and the corresponding mounting part may include a threaded connector. Accordingly, the at least one lens unit may be connected to the connecting bracket 230 through a threaded connection. In some embodiments, the connecting part may include a fixing plate (e.g., as shown in FIG. 3), and the corresponding mounting part may include a fixing seat. Accordingly, the at least one lens unit may be connected to the connecting bracket 230 through one or more screws. In some embodiments, the at least one lens unit may be mounted on the connecting bracket 230 through other connection ways such as gluing, welding, bonding, riveting, integral forming, suction connection, etc. In some embodiments, the connection between the connecting bracket 230 and at least one image sensor unit of the first image sensor unit 215 or the second image sensor unit 225 may be similar to the connection between the at least one lens unit and the connecting bracket 230. For example, the at least one image sensor unit may be mounted on the connecting bracket 230 through a connecting part of the at least one image sensor unit and another mounting part on the connecting bracket 230 corresponding to the connecting part. As another example, the at least one image sensor unit may be mounted on the connecting bracket 230 by gluing, welding, bonding, riveting, integral forming, suction connection, etc. More descriptions regarding the connection of components of a binocular camera may be found elsewhere in the present disclosure (e.g. FIGS. 3 and 4, and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the binocular camera 200 may be mounted in a housing (e.g., the housing 700 shown in FIG. 7). As another example, the terms "first," "second" are just for the convenience of description, the camera component 200a in FIGS. 2A and 2B may represent a second camera component, and the camera component 200b in FIGS. 2A and 2B may represent a first camera component.

In some embodiments, the angle α between the first optical axis and the second optical axis may be adjustable. For example, when driven by a motor device, the first mounting surface 232 and the corresponding second mounting surface 234 may be consistently inclined to a certain angle (e.g., with respect to the horizontal plane), while the third mounting surface 236 and the corresponding fourth mounting surface 238 may be maintained. As another example, when driven by one or more motor devices, the first mounting surface 232 and the corresponding second mounting surface 234 may be consistently inclined to a first angle (e.g., with respect to the horizontal plane), and the third mounting surface 236 and the corresponding fourth mounting surface 238 may be consistently inclined to a second angle (e.g., with respect to the horizontal plane). The first angle may be different from the second angle.

FIG. 3 is an exploded diagram of an exemplary binocular camera according to some embodiments of the present disclosure. As shown in FIG. 3, a binocular camera 300 may include a first lens unit 310, a second lens unit 320, a first image sensor unit 315, a second image sensor unit 325, and a connecting bracket 330. The binocular camera 300 may include two camera components formed based on the first lens unit 310, the second lens unit 320, the first image sensor unit 315, the second image sensor unit 325, and the connecting bracket 330. The two camera components of the binocular camera 300 may be similar to the first camera component 200a and the second camera component 200b as described in FIGS. 2A and 2B.

The connecting bracket 330 may include a bracket body configured to support the two camera components of the binocular camera 300. The connecting bracket 330 may further include a first mounting surface for connecting the first lens unit 310, a second mounting surface corresponding to the first mounting surface for connecting the first image sensor unit 315, a third mounting surface for connecting the second lens unit 320, and a fourth mounting surface corresponding to the third mounting surface for connecting the second image sensor unit 325. In some embodiments, the connecting bracket 330 may further include one or more adjustment components (e.g., springs 336 and 338) configured to adjust the second mounting surface corresponding to the first image sensor unit 315 and/or the fourth mounting surface corresponding to the second image sensor unit 325. More descriptions regarding the structure of the connecting bracket 230 may be found elsewhere in the present disclosure (e.g., FIGS. 5A-5B and 6A-6C, and the descriptions thereof).

In some embodiments, the first lens unit 310 may include a first fixing plate 312 (also referred to as a first connecting part 312). The first fixing plate 312 may be configured to cooperate with a first fixing seat (also referred to as a first mounting part) (not shown) on the connecting bracket 330 to enable the first lens unit 310 to be mounted on the connecting bracket 330. Specifically, in some embodiments, the first fixing plate 312 may be connected to the first fixing seat by one or more screws 314. For example, a size of the first fixing plate 312 may be greater than a size of an end of the first lens unit 310 close to the connecting bracket 330, so that one or more holes can be provided on the first fixing plate 312 to allow the one or more screws 314 to pass through the one or more holes to fix the first lens unit 310 on the connecting bracket 330. In some embodiments, the first fixing plate 312 may be made of a material including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof. Similarly, the second lens unit 320 may include a second fixing plate 322 (also referred to as a second connecting part 322). The second fixing plate 322 may be the same as or different from the first fixing plate 312. The second fixing plate 322 may be configured to cooperate with a second fixing seat (also referred to as a second mounting part) (not shown) on the connecting bracket 330 to enable the second lens unit 320 to be mounted on the connecting bracket 330. Specifically, in some embodiments, the second fixing plate 322 may be connected to the second fixing seat by one or more screws 324. For example, a size of the second fixing plate 322 may be greater than a size of an end of the second lens unit 320 close to the connecting bracket 330, so that one or more holes can be provided on the second fixing plate 322 to allow the one or more screws 324 to pass through the one or more holes to fix the second lens unit 320 on the connecting bracket 330. In some embodiments, the second fixing plate 322 may be made of a material including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof.

In some embodiments, the shape of the fixing plate may include, for example, a rectangular shape, a circular shape, a triangular shape, a hexagon shape, an irregular shape, etc. In some embodiments, the fixing plates 312 and 322 may have the same shape or different shapes. For example, the first fixing plate 312 may have a rectangular shape, while the second fixing plate 322 may have a circular shape. As another example, both the fixing plates 312 and 322 may have a rectangular shape as shown in FIG. 3.

The first image sensor unit 315 may include a first image sensor mounted on a first printed circuit board (PCB) 3152. In some embodiments, an image sensor mounted on a PCB may also be referred to as a sensor board. The first sensor board 3152 may convert one or more optical signals transmitted from the first lens unit 310 into one or more electrical signals. In some embodiments, the first sensor unit 315 may be connected to the connecting bracket 330 through a third connecting part (e.g., a third fixing plate) on the first sensor unit 315 similar to the first connecting part 312. For example, the third connecting part may be connected to the connecting bracket 330 by one or more screws 316, glues, or the like, or any combination. In some embodiments, the first image sensor unit 315 may further include a heat dissipation plate 3154 configured to promote heat dissipation of the first sensor board 3152. The heat dissipation plate 3154 may include an aperture corresponding to a first aperture 332 to transmit the one or more optical signals from the first lens unit 310 to the first sensor board 3152. In some embodiments, the heat dissipation plate 3154 may also be used as the third fixing plate. In some embodiments, the heat dissipation plate 3154 may be made of a material including silver, copper, aluminum, steel, copper-aluminum alloy, graphite sheet, thermal paste, ultra-thin heat pipe, phase change material, carbon fiber thermal conductive sheet, or the like, or any combination thereof. In some embodiments, the first image sensor unit 315 may further include an IR-cut removable (ICR) 3156 configured to filter out infrared light under a daytime mode to avoid color cast, and allow infrared light to pass through the corresponding aperture under a night mode to enhance the image brightness.

The second image sensor unit 325 may be similar to the first image sensor unit 315. For example, the second image sensor unit 325 may include a second sensor board 3252. The second sensor board 3252 may convert one or more optical signals transmitted from the second lens unit 320 into one or more electrical signals. As another example, the second image sensor unit 325 may further include a heat dissipation plate 3254, a shock absorber 3256, or the like, or any combination thereof. The heat dissipation plate 3254 may include an aperture corresponding to a second aperture 334 to transmit the one or more optical signals from the second lens unit 320 to the second sensor board 3252. As a further example, the second sensor unit 325 may be connected to the connecting bracket 330 through a fourth connecting part (e.g., a fourth fixing plate) on the second sensor unit 325 similar to the first connecting part 312, and the fourth fixing plate may be connected to the connecting bracket 330 by one or more screws 326, glues, or the like, or any combination.

FIG. 4 is an exploded diagram of an exemplary binocular camera according to some embodiments of the present disclosure. A binocular camera 400 may be similar to the binocular camera 300 as described in FIG. 3. For example, the binocular camera 400 may include a first lens unit 410, a second lens unit 420, a first image sensor unit 415, a second image sensor unit 425, and a connecting bracket 430. Specifically, the first image sensor unit 415 may be similar to the first image sensor unit 315. The second image sensor unit 425 may be similar to the second image sensor unit 325. The first lens unit 410 may be similar to the first lens unit 310 except that a first connecting part 412 is different from the first connecting part 312. The second image sensor unit 425 may be similar to the second image sensor unit 325 except that a second connecting part 422 is different from the second connecting part 322. The connecting bracket 430 may be similar to the connecting bracket 330 except that a first mounting part of the connecting bracket 330 is different from and a first mounting part of the connecting bracket 430 and a second mounting part of the connecting bracket 330 is different from and a second mounting part of the connecting bracket 430. More descriptions about the components of the binocular camera 400 may be found elsewhere in the present disclosure (e.g., FIG. 3 and the descriptions thereof).

The first lens unit 410 may include a first threaded joint 412 (i.e., the first connecting part 412). The first threaded joint 412 may be configured to cooperate with a first threaded connector (not shown) on the connecting bracket 430 (e.g., a first mounting surface of the connecting bracket 430) to enable the first lens unit 410 to be mounted on the connecting bracket 430. Similarly, the second lens unit 420 may include a second threaded joint 422 (i.e., the second connecting part 422). The second threaded joint 422 may be configured to cooperate with a second threaded connector (not shown) on the connecting bracket 430 (e.g., a third mounting surface of the connecting bracket 430) to enable the second lens unit 420 to be mounted on the connecting bracket 430.

Figure 5A:
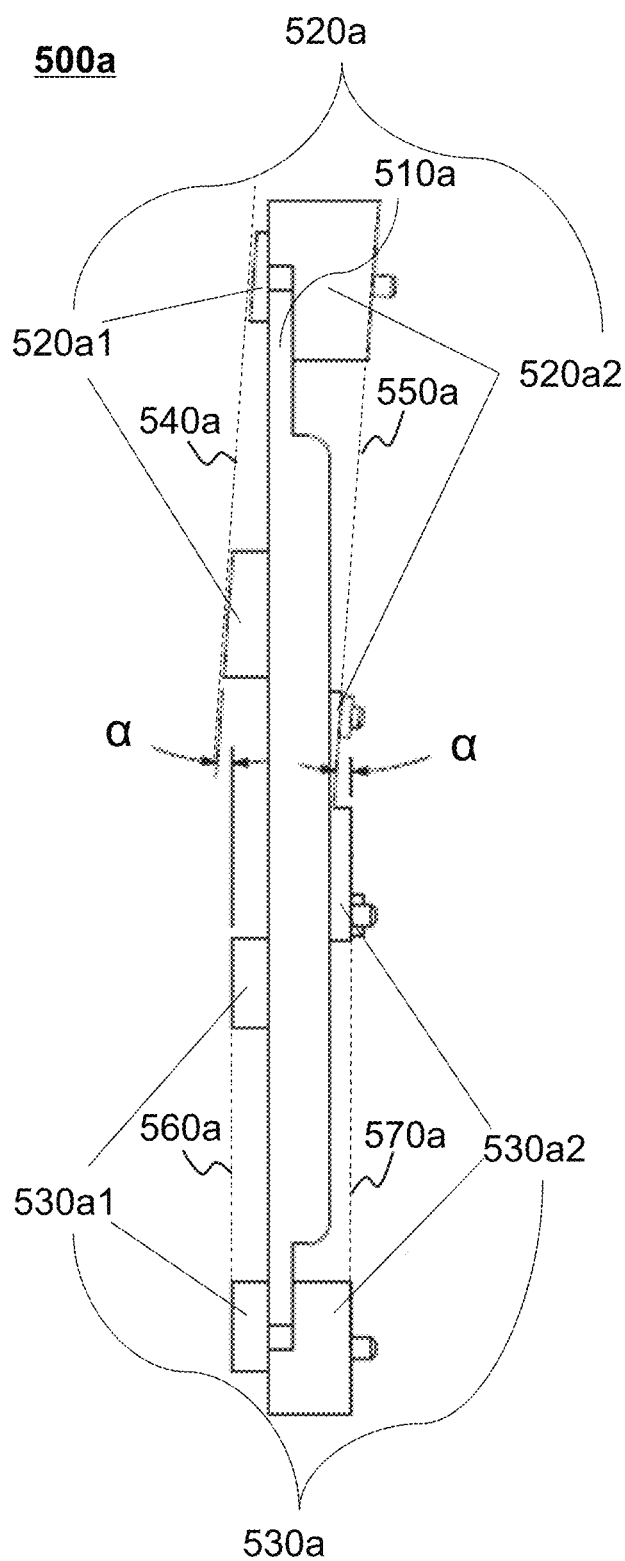
FIG. 5A is a side view of an exemplary connecting bracket according to some embodiments of the present disclosure.

FIG. 5A is a side view of an exemplary connecting bracket according to some embodiments of the present disclosure. In some embodiments, a connecting bracket 500a may be used in a camera system (e.g., the camera(s) 110, or the binocular camera 200) for mounting two or more camera components. Specifically, in some embodiments, the connecting bracket 500a may be used to connect two or more optical components (e.g., two or more lens units) and/or two or more electronic components (e.g., two or more image sensor units) of the camera system. As shown in FIG. 5A, the connecting bracket 500a may include a bracket body 510a, and the bracket body 510a may be provided with a first connecting portion 520a and a second connecting portion 530a.

The bracket body 510a may be configured to support a first camera component (e.g., the first camera component 200a in FIG. 2A) and a second camera component (e.g., the second camera component 200b in FIG. 2A). Specifically, the first connecting portion 520a together with the bracket body 510 may be configured to support the first camera component, and the second connecting portion 530a together with the bracket body 510a may be configured to support the second camera component. In some embodiments, the bracket body 510a may be made of a rigid material including metal (e.g., aluminum, gold, copper, iron, etc.), alloy (e.g., aluminum-magnesium alloy, titanium alloy), steel, etc. In some embodiments, the bracket body 510a may be made of plastic (e.g., polymethyl methacrylate (PMMA), polyurethane (PU), silicone resin (SI), etc.), aluminum composite materials, or the like, or any combination thereof.

In some embodiments, the first connecting portion 520a may include a first mounting part 520a1 and a second mounting part 520a2. The first mounting part 520a1 and the second mounting part 520a2 may be disposed on opposite sides of the bracket body 510a. The first mounting part 520a1 may be configured to cooperate with a first connecting part on a first lens unit of the first camera component to enable the first lens unit to be mounted on the connecting bracket 500a. The second mounting part 520a2 may be configured to cooperate with a third connecting part on a first image sensor unit of the first camera component to enable the first image sensor unit to be mounted on the connecting bracket 500a. In some embodiments, the first mounting part 520a1 and/or the second mounting part 520a2 may be made of various materials including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof.

In some embodiments, as shown in FIG. 5A, the first mounting part 520a1 may include a first fixing seat, and the first connecting part on the first lens unit of the first camera component may include a first fixing plate corresponding to the first fixing seat. Specifically, the first fixing seat may include one or more fixing units (e.g., fixing units 602, 604, 606, and 608 illustrated in FIG. 6A) whose surfaces are on a same plane. At least one of the one or more first fixing units may include a hole with an inner thread. The first lens unit may be connected to the connecting bracket 500a by one or more screws matching with the inner threads of the one or more first fixing units through a first connecting part (or a first fixing plate) on the first lens unit. In some embodiments, the first fixing plate may be connected to the first fixing seat by one or more screws. In some embodiments, the second mounting part 520a2 may include a third fixing seat, and the third connecting part on the first image sensor unit of the first camera component may include a third fixing plate (e.g., the heat dissipation plate 3154 illustrated in FIG. 3) corresponding to the third fixing seat. The third fixing plate may be connected to the third fixing seat by one or more screws.

Similarly, the second connecting portion 530a may include a third mounting part 530a1 and a fourth mounting part 530a2. The third mounting part 530a1 and the fourth mounting part 530a2 may be disposed on opposite sides of the bracket body 510a. The third mounting part 530a1 may be configured to cooperate with a second connecting part on a second lens unit of the second camera component to enable the second lens unit to be mounted on the connecting bracket 500a. The fourth mounting part 530a2 may be configured to cooperate with a fourth connecting part on a second image sensor unit of the second camera component to enable the second image sensor unit to be mounted on the connecting bracket 500a. In some embodiments, the third mounting part 530a1 and/or the fourth mounting part 530a2 may be made of various materials including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof.

In some embodiments, the first mounting part 520a1, the second mounting part 520a2, the third mounting part 530a1, and/or the fourth mounting part 530a2 may be the same as or different from each other. In some embodiments, when the material of the bracket body 510a is the same as the materials of the first mounting part 520a1, the second mounting part 520a2, the third mounting part 530a1, and/or the fourth mounting part 530a2, the first mounting part 520a1, the second mounting part 520a2, the third mounting part 530a1, the fourth mounting part 530a2, and/or the bracket body 510a may be integrally formed.

In some embodiments, the third mounting part 530a1 may include a second fixing seat, and the second connecting part on the second lens unit of the second camera component may include a second fixing plate corresponding to the second fixing seat. Specifically, the second fixing seat may include one or more fixing units (e.g., fixing units 610, 612, 614, and 616 illustrated in FIG. 6A) whose surfaces are on a same plane. At least one of the one or more second fixing units may include a hole with an inner thread. The second lens unit may be connected to the connecting bracket 500a by one or more screws matching with the inner threads of the one or more second fixing units through a second connecting part (or a second fixing plate) on the second lens unit. The second fixing plate may be connected to the second fixing seat by one or more screws. In some embodiments, the fourth mounting part 530a2 may include a fourth fixing seat, and the fourth connecting part on the second image sensor unit of the second camera component may include a fourth fixing plate (e.g., the heat dissipation plate 3254 illustrated in FIG. 3) corresponding to the fourth fixing seat. The fourth fixing plate may be connected to the fourth fixing seat by one or more screws.

In some embodiments, the first mounting part 520a1 and the third mounting part 530a1 may be disposed on a same side of the bracket body 510a (as shown in FIG. 5A). Correspondingly, the second mounting part 520a2 and the fourth mounting part 530a2 may be disposed on a same side of the bracket body 510a. In such cases, the first lens unit of the first camera component and the second lens unit of the second camera component may be disposed on a same side of the bracket body 510a. The first image sensor unit of the first camera component and the second image sensor unit of the second camera component may be disposed on another side of the bracket body 510a. The first camera component and the second camera component may be used to capture one or more images or videos on a same side of the bracket body 510a. In some embodiments, the first mounting part 520a1 and the fourth mounting part 530a2 may be disposed on a same side of the bracket body 510a. Correspondingly, the second mounting part 520a2 and the third mounting part 530a1 may be disposed on a same side of the bracket body 510a. In such cases, the first lens unit of the first camera component and the second image sensor unit of the second camera component may be disposed on a same side of the bracket body 510a. The first image sensor unit of the first camera component and the second lens unit of the second camera component may be disposed on a same side of the bracket body 510a. The first camera component and the second camera component may be used to capture one or more images or videos on different sides of the bracket body 510a.

In some embodiments, a mounting part of a connecting portion on a bracket body may define a mounting surface of the connecting portion. As used herein, a mounting surface may refer to a surface of a mounting part on which other components (e.g., a lens unit, an image sensor unit) can be mounted. As shown in FIG. 5A, the first connecting portion 520a may include a first mounting surface 540a corresponding to the first mounting part 520a1 and a second mounting surface 550a corresponding to the second mounting part 520a2. The first mounting surface 540a may be configured to connect the first lens unit of the first camera component. The second mounting surface 550a may be configured to connect the first image sensor unit of the first camera component. As set forth, corresponding to the arrangement of the first mounting part 520a1 and the second mounting part 520a2, the first mounting surface 540a and the second mounting surface 550a may be disposed on opposite sides of the bracket body 510a. The first mounting surface 540a may be parallel to the second mounting surface 550a. Similarly, the second connecting portion 530a may include a third mounting surface 560a corresponding to the third mounting part 530a1, and a fourth mounting surface 570a corresponding to the fourth mounting part 530a2. The third mounting surface 560a may be configured to connect the second lens unit of the second camera component. The fourth mounting surface 570a may be configured to connect the second image sensor unit of the second camera component. As set forth, corresponding to the arrangement of the third mounting part 530a1 and the fourth mounting part 530a2, the third mounting surface 560a and the fourth mounting surface 570a may be disposed on opposite sides of the bracket body 510a. The third mounting surface 560a may be parallel to the fourth mounting surface 570a.

In some embodiments, a predetermined angle may be formed between the first connecting portion 520a and the second connecting portion 530a such that when the first camera component is mounted on the first connecting portion 520a and the second camera component is mounted on the second connecting portion 530a, an angle between a first optical axis of the first camera component and a second optical axis of the second camera component (e.g., an angle between a first optical axis of the first camera component 200a and a second optical axis of the second camera component 200b illustrated in FIGS. 2A and 2B) can be equal to the predetermined angle. As used herein, an angle between the first connecting portion 520a and the second connecting portion 520b may refer to an angle between two mounting surfaces disposed on the same side of the bracket body 510a. For illustration purposes, the first mounting part 520a1 and the third mounting part 530a1 being disposed on the same side of the bracket body 510a may be taken as an example. Thus, the first mounting surface 540a and the third mounting surface 560a may be disposed on one side of the bracket body 510a, and the second mounting surface 550a and the fourth mounting surface 570a may be disposed on another side of the bracket body 510a. Accordingly, the predetermined angle between the first connecting portion 520a and the second connecting portion 530a may be equal to an angle α between the first mounting surface 540a and the third mounting surface 560a, or an angle α between the second mounting surface 550*a* and the fourth mounting surface 570*a* as illustrated in FIG. 5A.

In some embodiments, an angle between the first mounting surface 540*a* and the bracket body 510*a* (or a surface of the bracket body 510*a*) may equal to the predetermined angle, while the third mounting surface 560*a* may be parallel to the bracket body 510*a*. Correspondingly, an angle between the second mounting surface 550*a* and the bracket body 510*a* may equal to the predetermined angle, while the fourth mounting surface 570*a* may be parallel to the bracket body 510*a*. Alternatively, an angle between the third mounting surface 560*a* and the bracket body 510*a* may equal to the predetermined angle, while the first mounting surface 540*a* may be parallel to the bracket body 510*a*. Correspondingly, an angle between the fourth mounting surface 570*a* and the bracket body 510*a* may equal to the predetermined angle, while the second mounting surface 550*a* may be parallel to the bracket body 510*a*.

In some embodiments, the predetermined angle may be set in an angle range from 0° to 90° according to actual needs. For example, the predetermined angle may be set as 2°, 3°, 15°, 20°, 30°, 45°, 60°, 90°, etc. In some embodiments, the predetermined angle may be adjusted by a motor device. More descriptions of the predetermined angle between a first optical axis of the first camera component and the second optical axis of the second camera component may be found elsewhere in the present disclosure (e.g., FIGS. 2A and 2B, and the descriptions thereof).

In some embodiments, the connecting bracket 500*a* may further include one or more apertures each of which corresponds to a camera component, one or more fences, one or more protruding parts, one or more reinforced structures, or the like, or any combination thereof. More descriptions of the connecting bracket 500*a* may be found elsewhere in the present disclosure (e.g., FIGS. 6A-6C, and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the connecting bracket 500*a* in the present disclosure may further be used to connect other components of a camera, such as a processor, a controller, etc.

Figure 5B:
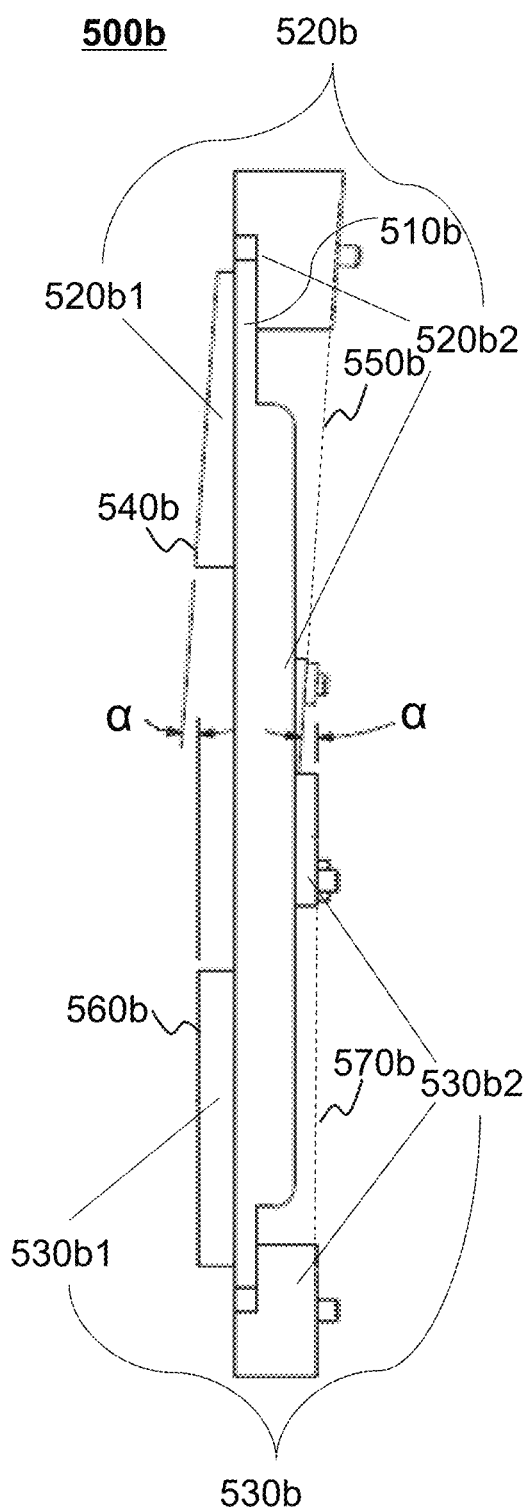
FIG. 5B is a side view of another exemplary connecting bracket according to some embodiments of the present disclosure.

FIG. 5B is a side view of another exemplary connecting bracket according to some embodiments of the present disclosure. A connecting bracket 500*b* may be similar to the connecting bracket 500*a* described in FIG. 5A. For example, as shown in FIG. 5B, the connecting bracket 500*b* may include a bracket body 510*b*, and the connecting bracket 500*b* may be provided with a first connecting portion 520*b* and a second connecting portion 530*b*.

In some embodiments, as shown in FIG. 5B, the first connecting portion 520*b* may include a first mounting part 520*b*1 and a second mounting part 520*b*2. The first mounting part 520*b*1 may be configured to cooperate with a first connecting part on a first lens unit of the first camera component to enable the first lens unit to be mounted on the connecting bracket 500*b*. The second mounting part 520*b*2 may be configured to cooperate with a third connecting part on a first image sensor unit of the first camera component to enable the first image sensor unit to be mounted on the connecting bracket 500*b*. The first mounting part 520*b*1 and the second mounting part 520*b*2 may be disposed on opposite sides of the bracket body 510*b*.

The first mounting part 520*b*1 may include a first threaded connector, and the first connecting part on the first lens unit of the first camera component may include a first threaded joint corresponding to the first threaded connector. The first threaded joint may be connected to the first threaded connector through a threaded connection. Specifically, the first mounting part 520*b*1 may include a first specific protruding part (e.g., the first specific protruding part 620*b* shown in FIG. 6B) with a first mounting surface. The first specific protruding part may include a hole (not shown) in the middle of the first specific protruding part. The first mounting surface of the first specific protruding part may be a bottom of the hole. The inner or outer surface of the hole may include thread. A size of the hole may match a size of an end of the first lens unit close to the connecting bracket 500*b*, so that the first lens unit can be mounted on the connecting bracket 500*b* through a threaded connection, and a surface of the first lens unit can be parallel to the first mounting surface. More descriptions of the first specific protruding part may be found elsewhere of the present disclosure (e.g., FIG. 6B and the descriptions thereof). In some embodiments, the first mounting part 520*b*1 and/or the second mounting part 520*b*2 may be made of various materials including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof. In some embodiments, the second mounting part 520*b*2 may include a third fixing seat, and the third connecting part on the first image sensor unit of the first camera component may include a third fixing plate (e.g., the heat dissipation plate 3154 illustrated in FIG. 3) corresponding to the third fixing seat. The third fixing plate may be connected to the third fixing seat by one or more screws.

Similarly, the second connecting portion 530*b* may include a third mounting part 530*b*1 and a fourth mounting part 530*b*2. The third mounting part 530*b*1 may be configured to cooperate with a second connecting part on a second lens unit of the second camera component to enable the second lens unit to be mounted on the connecting bracket 500*b*. The fourth mounting part 530*b*2 may be configured to cooperate with a fourth connecting part on a second image sensor unit of the second camera component to enable the second image sensor unit to be mounted on the connecting bracket 500*b*. The third mounting part 530*b*1 and the fourth mounting part 530*b*2 may be disposed on opposite sides of the bracket body 510*b*.

The third mounting part 530*b*1 may include a second threaded connector, and the second connecting part on the second lens unit of the second camera component may include a second threaded joint corresponding to the second threaded connector. The second threaded joint may be connected to the second threaded connector by a threaded connection. Specifically, the third mounting part 530*b*1 may include a second specific protruding part (e.g., the second specific protruding part 630*b* shown in FIG. 6B) with third mounting surface. The second specific protruding part may include a hole (not shown) in the middle of the second specific protruding part. The third mounting surface of the second specific protruding part may be a bottom of the hole. The inner or outer surface of the hole may include thread. A size of the hole may match a size of an end of the second lens unit close to the connecting bracket 500*b*, so that the second lens unit can be mounted on the connecting bracket 500*b* through a threaded connection, and a surface of the second lens unit can be parallel to the third mounting surface. More descriptions of the second specific protruding part may be found elsewhere of the present disclosure (e.g., FIG. 6B and the descriptions thereof). In some embodiments, the third mounting part 530b1 and/or the fourth mounting part 530b2 may be made of various materials including metal (e.g., aluminum, gold, copper, iron, etc.), alloy (e.g., aluminum-magnesium alloy, titanium alloy), steel, plastic (e.g., polymethyl methacrylate (PMMA), polyurethane (PU), silicone resin (SI), etc.), aluminum composite materials, or the like, or any combination thereof. More descriptions of the connecting bracket 500b may be found elsewhere in the present disclosure (e.g., FIGS. 5A, 6B, and 6C, and the descriptions thereof).

Figure 6A:
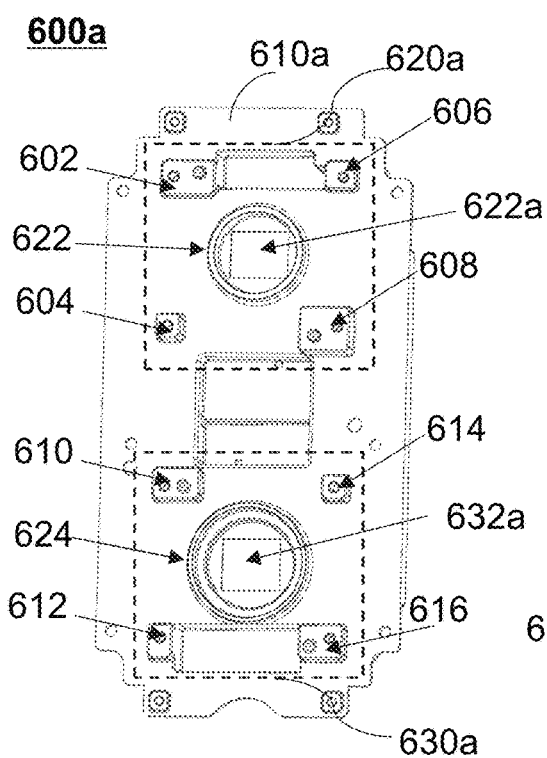
FIG. 6A is a front view of an exemplary connecting bracket according to some embodiments of the present disclosure.

FIG. 6A is a front view of an exemplary connecting bracket according to some embodiments of the present disclosure. In some embodiments, FIGS. 6A and 5A may be different views of a same connecting bracket from different directions. As illustrated in FIG. 6A, a connecting bracket 600a may include a bracket body 610a. Two mounting parts (including a first mounting part 620a and a third mounting part 630a) of the connecting bracket 600a for mounting two lens units (e.g., a first lens unit and a second lens unit) may be disposed on a same side of the connecting bracket 600a.

As illustrated in FIG. 6A, the first mounting part 620a (or a first fixing seat, indicated by the dotted frame) may include one or more first fixing units (e.g., first fixing units 602, 604, 606, and 608) configured to connect the first lens unit. In some embodiments, one or more second fixing units may also be referred to as a fixing seat. In some embodiments, at least one of the one or more first fixing units may include a hole with an inner thread. The first lens unit may be connected to the connecting bracket 600a by one or more screws matching with the inner threads of the one or more first fixing units through a first connecting part (or a first fixing plate) on the first lens unit. Similarly, the third mounting part 630a (or a second fixing seat, indicated by the dotted frame) may include one or more third fixing units (e.g., third fixing units 610, 612, 614, and 616) configured to connect the second lens unit. The second lens unit may be connected to the connecting bracket 600a by one or more screws through a second connecting part (or a second fixing plate) on the second lens unit. In some embodiments, at least one of the one or more third fixing units may be the same as at least one of the one or more first fixing units.

The bracket body 610a may include a first aperture 622a corresponding to the first lens unit and a second aperture 632a corresponding to the second lens unit. The first aperture 622a may be configured to transmit one or more optical signals from the first lens unit to a corresponding first image sensor unit. The second aperture 632a may be configured to transmit one or more optical signals from the second lens unit to a corresponding second image sensor unit. In some embodiments, the first aperture 622a and/or the second aperture 632a may have the shape of a square, a rectangle, a triangle, a polygon, a circle, an ellipse, an irregular shape, or the like.

In some embodiments, the bracket body 610a may further include a first protruding part 622 disposed around the first aperture 622a and/or a second protruding part 624 disposed around the second aperture 632a. The protruding part (i.e., the first protruding part 622 or the second protruding part 624) may be configured to limit a position of the corresponding lens unit, provide a protection function, block an interference light, etc. For example, an inner diameter of the protruding part may match an outer diameter of the corresponding lens unit, so that the corresponding lens unit can be accurately and stably mounted on the corresponding mounting surface. As another example, the first protruding part 622 may prevent contaminants (e.g., dust) from reaching the first lens unit to protect the first lens unit. In some embodiments, the first protruding part 622 and/or the second protruding part 624 may have the shape of a square, a rectangle, a triangle, a polygon, a circle, an ellipse, an irregular shape, or the like.

Figure 6B:
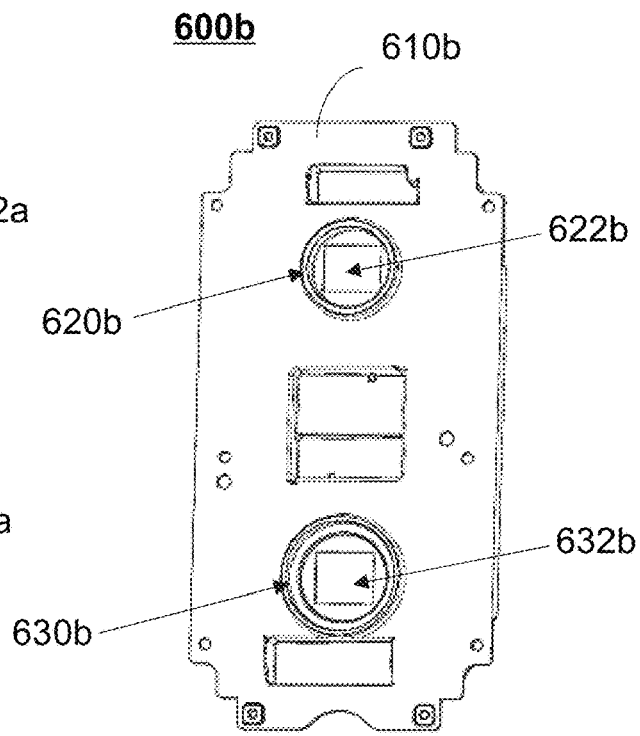
FIG. 6B is a front view of an exemplary connecting bracket according to some embodiments of the present disclosure.

FIG. 6B is a front view of an exemplary connecting bracket according to some embodiments of the present disclosure. In some embodiments, FIGS. 6B and 5B may be different views of a same connecting bracket from different directions. As illustrated in FIG. 6B, a connecting bracket 600b may include a bracket body 610b. The bracket body 610b may include a first aperture 622b and a second aperture 632b. Two mounting parts (e.g., a first mounting part 620b and a third mounting part 630b) of the connecting bracket 600b for mounting two lens units (including a first lens unit and a second lens unit) may be disposed on a same side of the connecting bracket 600b. As illustrated in FIG. 6B, The first mounting part 620b (also be referred to as a first threaded connector or a first specific protruding part) may be disposed around the first aperture 622b and be configured to connect to the first lens unit. The first lens unit may be connected to the connecting bracket 600b through a first connecting part (or a first threaded joint) on the first lens unit that matches with the first threaded connector. Thus, the first lens unit may be connected to the connecting bracket 600b by a threaded connection. For example, the first threaded connector may have an inner thread and an outer surface of the first threaded joint on the first lens unit may have an outer thread matching the inner thread of the first threaded connector. The first lens unit may be connected to the connecting bracket 600b based on the inner thread of the first threaded connector and the outer thread of the first threaded joint by a threaded connection. As another example, the first threaded connector may have an outer thread and an inner surface of the first threaded joint on the first lens unit may have an inner thread matching the outer thread of the first threaded connector. The first lens unit may be connected to the connecting bracket 600b based on the inner thread of the first threaded joint and the outer thread of the first threaded connector by a threaded connection. In some embodiments, the first threaded connector may be used as a first protruding part to limit a position of the corresponding lens unit, provide a protection function, block an interference light, etc. Similarly, the third mounting part 630b (also be referred to as a second threaded connector or a second specific protruding part) may be disposed around the second aperture 632b and be configured to connect to the second lens unit. The second lens unit may be connected to the connecting bracket 600b through a second connecting part (or a second threaded joint) on the second lens unit that matches with the second threaded connector. Thus, the second lens unit may be connected to the connecting bracket 600b by a threaded connection. In some embodiments, the second threaded connector may be used as a second protruding part to limit a position of the corresponding lens unit, provide a protection function, block an interference light, etc.

Figure 6C:
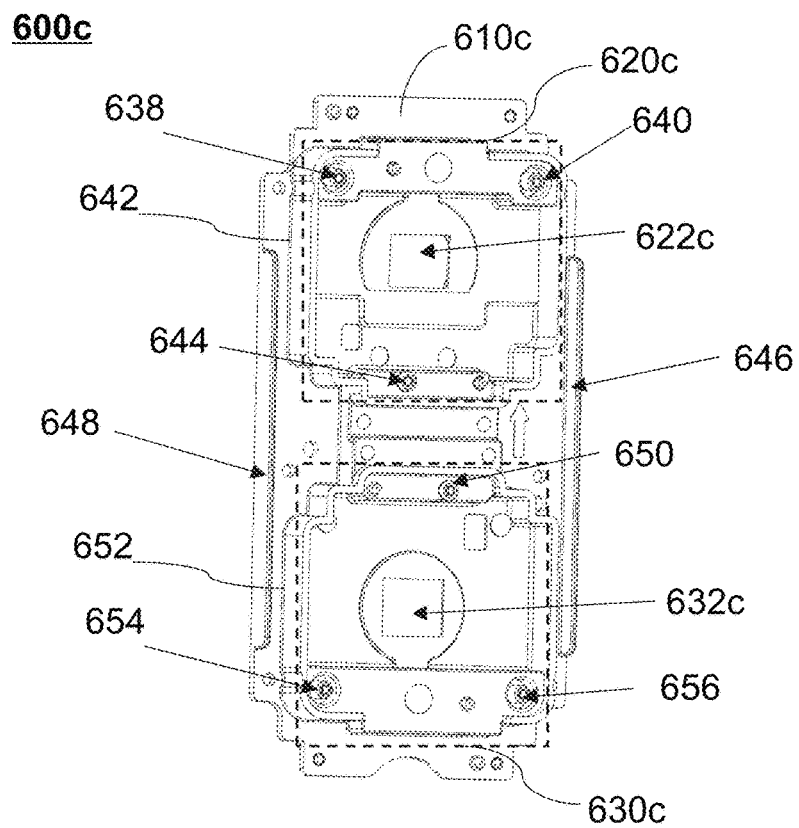
FIG. 6C is a back view of an exemplary connecting bracket according to some embodiments of the present disclosure.

FIG. 6C is a back view of an exemplary connecting bracket according to some embodiments of the present disclosure. In some embodiments, the connecting bracket 500a illustrated in FIG. 5A and the connecting bracket 500b illustrated in FIG. 5B may include a same back structure as illustrated in FIG. 6C. As illustrated in FIG. 6C, a connecting bracket 600c may include a bracket body 610c. The bracket body 610c may include a first aperture 622c and a second aperture 632c. Two mounting parts (including a second mounting part 620c and a fourth mounting part 630c) of the connecting bracket 600c for mounting two image sensor units (including a first image sensor unit and a second image sensor unit) may be disposed on a same side of the connecting bracket 600c.

As illustrated in FIG. 6C, the second mounting part 620c (or a third fixing seat, indicated by the dotted frame) may include one or more second fixing units (e.g., second fixing units 638, 640, and 644) configured to connect to the first image sensor unit. In some embodiments, at least one of the one or more second fixing units may include a hole with an inner thread. The first image sensor unit may be connected to the connecting bracket 600c by one or more screws matching with the inner threads of the one or more second fixing units through a third connecting part (or a third fixing plate) on the first image sensor unit. Similarly, the fourth mounting part 630c (or a fourth fixing seat, indicated by the dotted frame) may include one or more fourth fixing units (e.g., fourth fixing units 650, 654, and 656) configured to connect the second image sensor unit. The second image sensor unit may be connected to the connecting bracket 600c by one or more screws through a fourth connecting part (or a fourth fixing plate) on the second image sensor unit. In some embodiments, the fourth fixing units may be the same as or similar to the second fixing units.

In some embodiments, the connecting bracket 600c may further include a first fence 642 disposed around the first aperture 622c or the second mounting part facing the first image sensor unit and/or a second fence 652 disposed around the second aperture 632c or the fourth mounting part facing the second image sensor unit. The fence (i.e., the first fence 642 or the second fence 652) may be configured to strengthen the bracket body 610c, limit a position of the corresponding image sensor unit, provide a protection function, block an interference light, etc. For example, a size of the fence may match a size of the corresponding image sensor unit, so that the corresponding image sensor unit can be accurately and stably mounted on the corresponding mounting surface. As another example, the first fence 642 (or the second fence 652) may prevent contaminants (e.g., dust) from reaching the first image sensor unit (or the second image sensor unit) to protect the first image sensor unit (or the second image sensor unit). In some embodiments, the first fence 642 and/or the second fence 652 may have the shape of a square, a rectangle, a triangle, a polygon, a circle, an ellipse, an irregular shape, or the like.

In some embodiments, the connecting bracket 600c may further include one or more adjustment components configured to adjust a second mounting surface of the second mounting part 620c. Additionally or alternatively, the connecting bracket 600c may further include one or more adjustment components configured to adjust a fourth mounting surface of the fourth mounting part 630c. For example, during a process for assembling a camera component, after the first lens unit is mounted on the connecting bracket 600c, a screw may be firstly used to approximately position the first image sensor unit. The second mounting surface may be adjusted to a certain location using the one or more adjustment components until a distance between an optical center of the first lens unit and an optical center of the first image sensor unit is less than a threshold. Then one or more other screws (or together with a glue) may be used to fix the first image sensor unit on the connecting bracket 600c. In some embodiments, the adjustment components may include one or more elastic components including springs, metal sheets, etc. In some embodiments, when the elastic components includes springs, the springs may be disposed within a region defined by a fence (e.g., the first fence 642 or the second fence 648) on the connecting bracket 600c. For example, the springs may be disposed in the second fixing units (e.g., 638, 640, or 644) and/or the fourth fixing units (e.g., fixing units 650, 654, or 656).

In some embodiments, the connecting bracket 600c may further include one or more reinforced structures configured to strengthen the bracket body 610c. In some embodiments, the first fence 642 and/or the second fence 648 may be used as the reinforced structures. The one or more reinforced structures may be disposed on edge, middle, or inside of the bracket body 610c. For example, as shown in FIG. 6C, two reinforced structures 646 and 648 may be disposed on one or more edges of the bracket body 610c.

Figure 7:
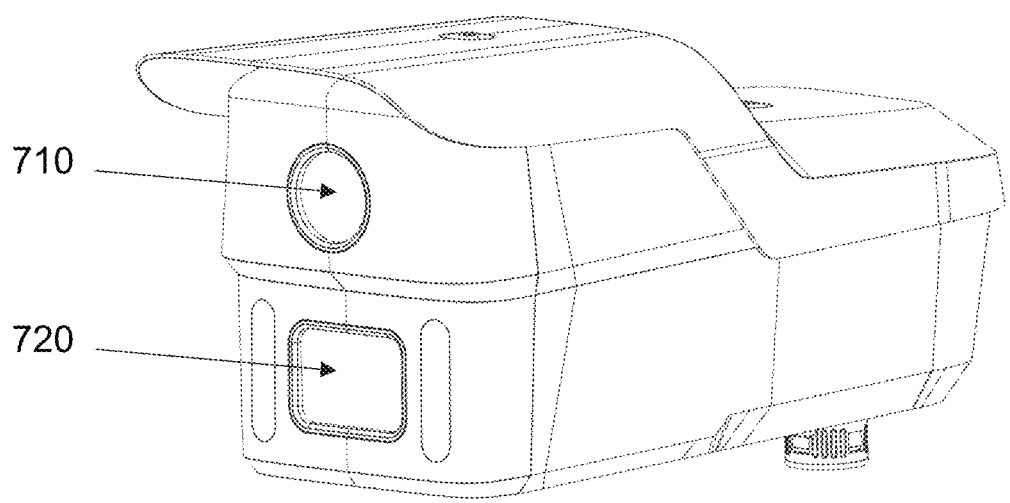
FIG. 7 is a schematic diagram of an exemplary housing of a binocular camera according to some embodiments of the present disclosure.

FIG. 7 is a schematic diagram of an exemplary housing of a binocular camera according to some embodiments of the present disclosure. As illustrated in FIG. 7, a front surface of a housing 700 may have two openings (e.g., openings 710 and 720) corresponding to two camera components of a binocular camera. The two camera components of the binocular camera are arranged in a vertical direction. In some embodiments, the two camera components of the binocular camera may be arranged in a horizontal direction. The binocular camera may be mounted anywhere that needs to be monitored. For example, the binocular camera may be mounted near a crosswalk to detect traffic violation behaviors. As another example, the binocular camera may be mounted in a classroom to monitor the behaviors of students.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be acquired by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A camera system, comprising:
a first lens unit;
a second lens unit;
a first image sensor unit corresponding to the first lens unit;
a second image sensor unit corresponding to the second lens unit; and
a connecting bracket configured to connect the first lens unit and the first image sensor unit to form a first camera component, and connect the second lens unit and the second image sensor unit to form a second camera component; wherein
a predetermined angle is formed between a first optical axis of the first camera component and a second optical axis of the second camera component, wherein the predetermined angle is greater than zero; and
wherein:
the first lens unit and the second lens unit are disposed on a first side of the connecting bracket, and the first image sensor unit and the second image sensor unit are disposed on a second side of the connecting bracket;
the connecting bracket includes:
a bracket body configured to support the first camera component and the second camera component;
a first mounting surface for connecting the first lens unit;

a second mounting surface corresponding to the first mounting surface for connecting the first image sensor unit;
a third mounting surface for connecting the second lens unit; and
a fourth mounting surface corresponding to the third mounting surface for connecting the second image sensor unit;
the first mounting surface is parallel to the second mounting surface;
the third mounting surface is parallel to the fourth mounting surface; and
an angle between the first mounting surface and the third mounting surface is equal to the predetermined angle.

2. The camera system of claim 1, wherein the first mounting surface or the third mounting surface is parallel to the bracket body of the connecting bracket.

3. The camera system of claim 1, wherein
the first lens unit includes a first connecting part;
the second lens unit includes a second connecting part; and
the connecting bracket further includes:
a first mounting part on the first mounting surface configured to cooperate with the first connecting part to mount the first lens unit on the connecting bracket; and
a second mounting part on the third mounting surface configured to cooperate with the second connecting part to mount the second lens unit on the connecting bracket.

4. The camera system of claim 3, wherein
the first connecting part includes a first threaded joint and the first mounting part includes a first threaded connector corresponding to the first threaded joint; or
the second connecting part includes a second threaded joint and the second mounting part includes a second threaded connector corresponding to the second threaded joint.

5. The camera system of claim 3, wherein
the first connecting part includes a first fixing plate and the first mounting part includes a first fixing seat corresponding to the first fixing plate, the first fixing plate being connected to the first fixing seat by one or more screws; or
the second connecting part includes a second fixing plate and the second mounting part includes a second fixing seat corresponding to the second fixing plate, the second fixing plate being connected to the second fixing seat by one or more screws.

6. The camera system of claim 1, wherein at least one image sensor unit of the first image sensor unit or the second image sensor unit includes a third fixing plate, and the at least one image sensor unit is connected to the connecting bracket by one or more screws through the third fixing plate.

7. The camera system of claim 1, wherein the predetermined angle is less than or equal to 15°.

8. The camera system of claim 1, wherein the connecting bracket further includes a first aperture configured to transmit one or more optical signals from the first lens unit to the first image sensor unit, and a second aperture configured to transmit one or more optical signals from the second lens unit to the second image sensor unit.

9. The camera system of claim 8, wherein the connecting bracket further includes:
a first protruding part disposed around the first aperture, the first protruding part being configured to limit a position of the first lens unit, provide a dust-proof function, or block an interference light; or
a second protruding part disposed around the second aperture, the second protruding part being configured to limit a position of the second lens unit, provide a dust-proof function, or block an interference light.

10. The camera system of claim 1, wherein the connecting bracket further includes one or more springs configured to adjust at least one of the second mounting surface, or the fourth mounting surface.

11. The camera system of claim 1, wherein the connecting bracket further includes a reinforced structure configured to strengthen the connecting bracket.

12. The camera system of claim 1, wherein the first lens unit includes a telephoto lens unit, and the second lens unit includes a wide-angle lens unit.

13. A connecting bracket, comprising:
a bracket body configured to support a first camera component and a second camera component;
wherein
the bracket body includes a first connecting portion configured to support the first camera component, and a second connecting portion configured to support the second camera component; and
a predetermined angle is formed between the first connecting portion and the second connecting portion such that when the first camera component is mounted on the first connecting portion and the second camera component is mounted on the second connecting portion, an angle between a first optical axis of the first camera component and a second optical axis of the second camera component is equal to the predetermined angle, wherein the predetermined angle is greater than zero.

14. The connecting bracket of claim 13, wherein the first connecting portion includes a first mounting surface and a second mounting surface corresponding to the first mounting surface, wherein
the first mounting surface is configured to connect a first lens unit of the first camera component,
the second mounting surface is configured to connect a first image sensor unit of the first camera component, and
the first mounting surface and the second mounting surface are disposed on opposite sides of the bracket body.

15. The connecting bracket of claim 13, wherein the second connecting portion includes a third mounting surface and a fourth mounting surface corresponding to the third mounting surface, wherein
the third mounting surface is configured to connect a second lens unit of the second camera component,
the fourth mounting surface is configured to connect a second image sensor unit of the second camera component, and
the third mounting surface and the fourth mounting surface are disposed on opposite sides of the bracket body.

16. The connecting bracket of claim 15, wherein
the first mounting surface and the third mounting surface are disposed on a same side of the bracket body, and
the second mounting surface and the fourth mounting surface are disposed on a same side of the bracket body.

17. The connecting bracket of claim 15, wherein
an angle between the first mounting surface and the third mounting surface is equal to the predetermined angle, or
an angle between the second mounting surface and the fourth mounting surface is equal to the predetermined angle.

18. A connecting bracket, comprising:
a bracket body configured to support a first camera component and a second camera component;
wherein
the bracket body includes a first mounting surface configured to connect a first lens unit of the first camera component, a second mounting surface configured to connect a first image sensor unit of the first camera component, a third mounting surface configured to connect a second lens unit of the second camera component, and a fourth mounting surface configured to connect a second image sensor unit of the second camera component;
the first mounting surface is parallel to the second mounting surface;
the third mounting surface is parallel to the fourth mounting surface; and
a predetermined angle is formed between the first mounting surface and the third mounting surface, wherein the predetermined angle is greater than zero.

* * * * *